United States Patent
Ishikawa

(10) Patent No.: US 12,523,187 B2
(45) Date of Patent: Jan. 13, 2026

(54) INTERNAL COMBUSTION ENGINE AND CYLINDER BLOCK

(71) Applicant: ISUZU MOTORS LIMITED, Yokohama (JP)

(72) Inventor: Yasuhiro Ishikawa, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/609,753

(22) Filed: Mar. 19, 2024

(65) Prior Publication Data

US 2024/0328370 A1  Oct. 3, 2024

(30) Foreign Application Priority Data

Mar. 28, 2023 (JP) ................... 2023-052299

(51) Int. Cl.
*F02F 1/00* (2006.01)
*F02F 1/18* (2006.01)

(52) U.S. Cl.
CPC ..................... *F02F 1/183* (2013.01)

(58) Field of Classification Search
CPC .... F02F 1/004; F02F 1/16; F02F 1/183; F16J 10/04
See application file for complete search history.

(56) References Cited

U.S. PATENT DOCUMENTS

| | | | | |
|---|---|---|---|---|
| 5,544,627 A * | 8/1996 | Terziev | ...................... | F16J 1/14 |
| | | | | 123/53.1 |
| 10,359,000 B2 * | 7/2019 | Gniesmer | ................. | F02F 1/16 |
| 10,895,218 B2 * | 1/2021 | Bochart | .................. | F02F 1/004 |
| 11,286,875 B1 * | 3/2022 | Reding | ..................... | F02F 1/12 |
| 11,480,131 B2 * | 10/2022 | Sethy | ..................... | F02F 1/004 |
| 12,241,405 B2 * | 3/2025 | Ishikawa | ................... | F02F 1/18 |

FOREIGN PATENT DOCUMENTS

| | | |
|---|---|---|
| JP | H046550 U | 1/1992 |
| JP | H078544 U | 2/1995 |
| JP | 2011080436 A | 4/2011 |
| JP | 2020148158 A | 9/2020 |

\* cited by examiner

*Primary Examiner* — Gonzalo Laguarda
(74) *Attorney, Agent, or Firm* — The Roy Gross Law Firm, LLC; Roy D. Gross

(57) ABSTRACT

An internal combustion engine includes: a cylinder block that includes a cylinder; and a piston that is stored in the cylinder in a manner capable of reciprocating along an axis line of the cylinder, in which the cylinder includes an oval inner circumference portion in which a diameter in a thrust-anti thrust direction is a minor diameter.

4 Claims, 5 Drawing Sheets

INTERNAL COMBUSTION ENGINE AND CYLINDER BLOCK

CROSS REFERENCE TO RELATED APPLICATIONS

This application is entitled to (or claims) the benefit of Japanese Patent Application No. 2023-052299, filed on Mar. 28, 2023, the disclosure of which including the specification, drawings and abstract is incorporated herein by reference in its entirety.

TECHNICAL FIELD

The present invention relates to an internal combustion engine and a cylinder block.

BACKGROUND ART

Conventionally, in an internal combustion engine such as an engine, in order to reduce abrasion loss of a piston that slides in a cylinder block, a method of reducing an outer circumferential area of a skirt portion contacting a cylinder-block inner circumferential surface is known, for example.

For example, in Patent Literature (hereinafter referred to as "PTL") 1, a skirt portion of a piston in a circumferential direction is formed in an oval shape longer in length in a thrust-anti thrust direction perpendicular to an axis of a piston pin than in a direction of the axis of the piston pin, thereby reducing a sliding area in between with an inner circumferential surface of a cylinder. Further, as a configuration in which a shape on a cylinder side is changed, for example, PTL 2 discloses a structure in which a cylinder includes an inner circumferential surface with a long thrust-anti thrust direction and, into this inner circumferential surface, a cylinder liner having a circular or oval inside is fitted.

CITATION LIST

Patent Literature

PTL 1
Japanese Patent Application Laid-Open No. H07-008544
PTL 2
Japanese Patent Application Laid-Open No. 2011-80436

SUMMARY OF INVENTION

Technical Problem

Incidentally, in the conventional configuration of PTL 1 mentioned above, in order to reduce a sliding area between the piston and the cylinder, it is conceivable to increase an oval amount (which is obtained by subtracting minor axis diameter from major axis diameter) in the skirt portion of the piston, i.e., to increase the length in the thrust-anti thrust direction.

However, an excessive oval amount decreases a contacting region between the piston and the cylinder at this part, but increases a surface pressure when the skirt portion is brought into contact at an upper portion of the cylinder with high combustion pressure. Consequently, a problem lies in that abrasion deterioration or seizure may occur due to oil film breakage at the upper portion of the cylinder.

An object of the present invention is to provide an internal combustion engine and a cylinder block each capable of reducing abrasion with a piston while retaining oil film on an upper portion of a cylinder.

Solution to Problem

In order to achieve the above object, an aspect of an internal combustion engine according to the present invention adopts a configuration that includes: a cylinder block that includes a cylinder; and a piston that is stored in the cylinder in a manner capable of reciprocating along an axis line of the cylinder, in which the cylinder includes an oval inner circumference portion in which a diameter in a thrust-anti thrust direction is a minor diameter.

Further, the present invention adopts a configuration in which a cylinder that stores therein a piston such that the piston is capable of reciprocating therein includes an oval inner circumference portion in which a diameter in a thrust-anti thrust direction is a minor diameter.

Advantageous Effects of Invention

According to the present invention, it is possible to reduce abrasion with a piston while retaining oil film on an upper portion of a cylinder.

DESCRIPTION OF EMBODIMENTS

Hereinafter, an embodiment of the present disclosure will be described with reference to the drawings. Engine 1 illustrated in FIG. 1 includes engine body 10 and transmission portion T/M connected to engine body 10. Engine 1 outputs a driving force via drive shaft 2 and rotationally drives wheels 3.

Figure 1:
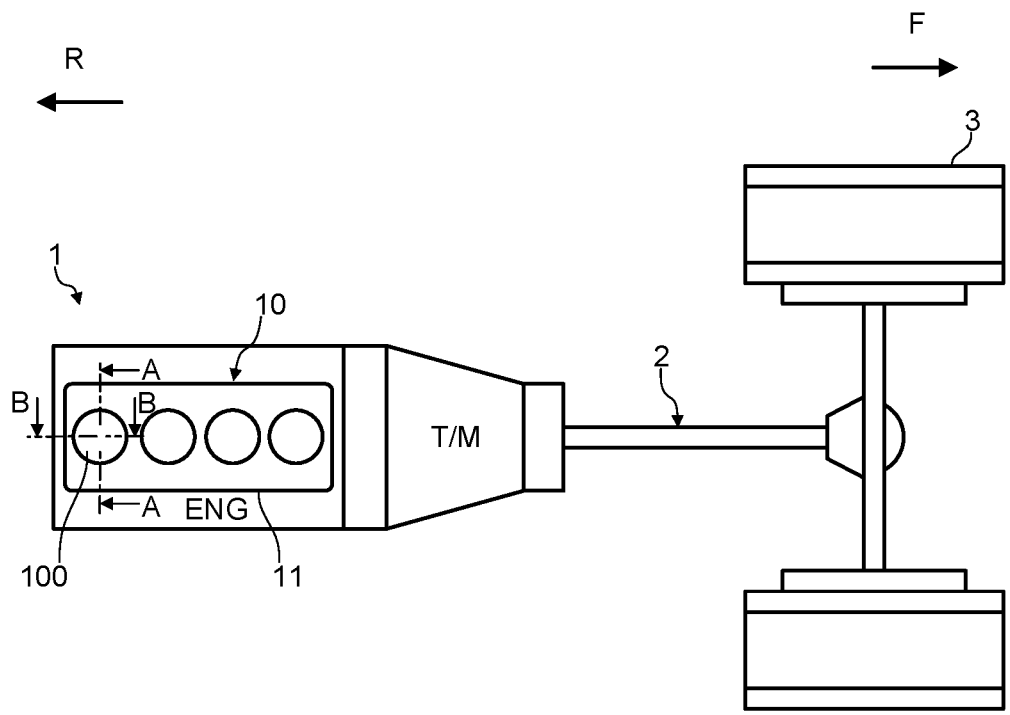
FIG. 1 schematically illustrates a vehicle including an internal combustion engine according to an embodiment of the present invention.
Figure 2:
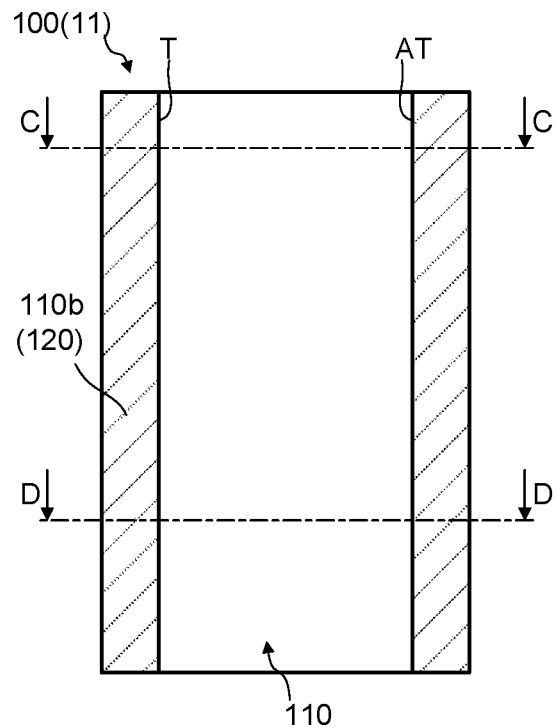
FIG. 2 is a schematic longitudinal cross-sectional view taken along an A-A line of FIG. 1.
Figure 3:
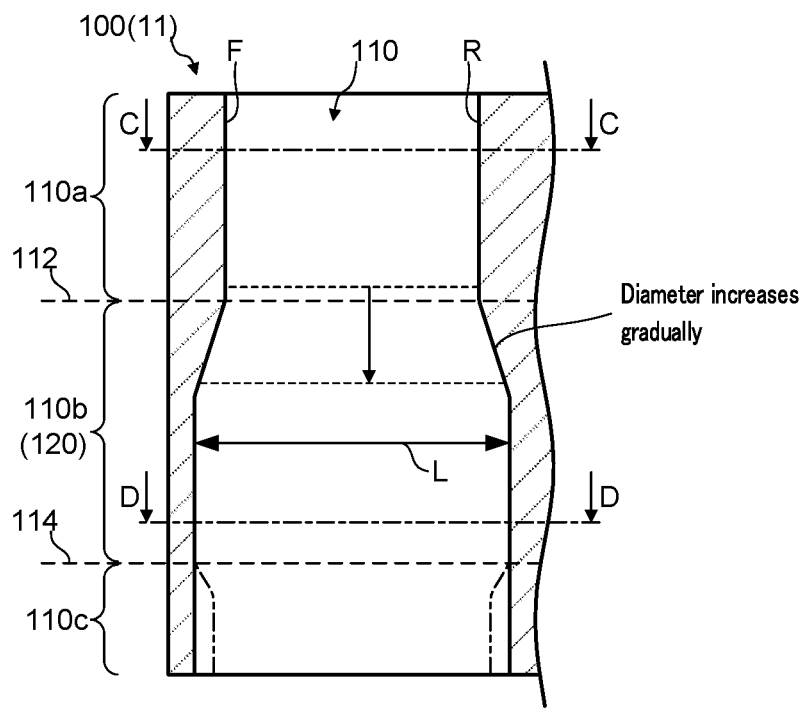
FIG. 3 is a schematic longitudinal cross-sectional view taken along a B-B line of FIG. 1.
Figure 4A:
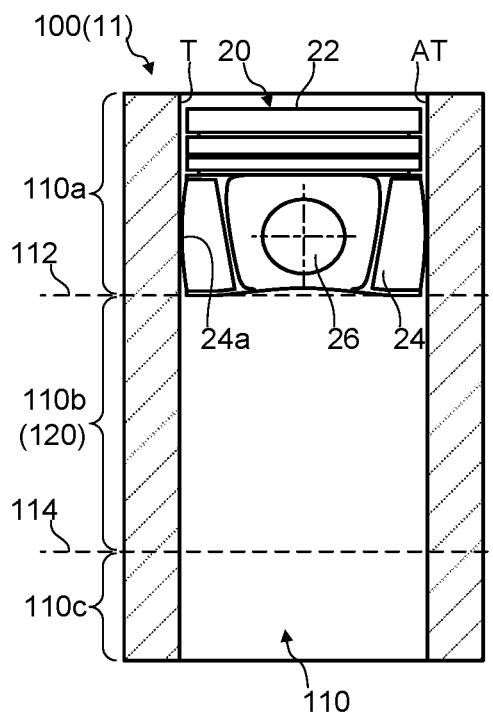
FIGS. 4A to 4D are each a cross-sectional view on a piston operation that generates a lateral pressure in a cylinder.
Figure 4B:
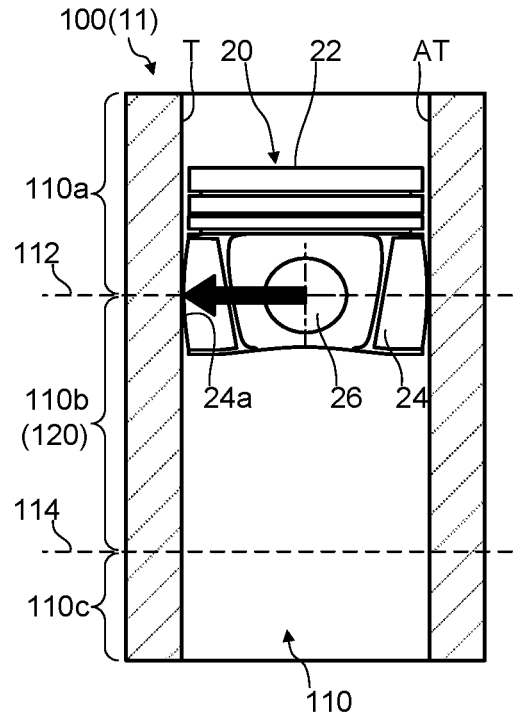
Figure 4C:
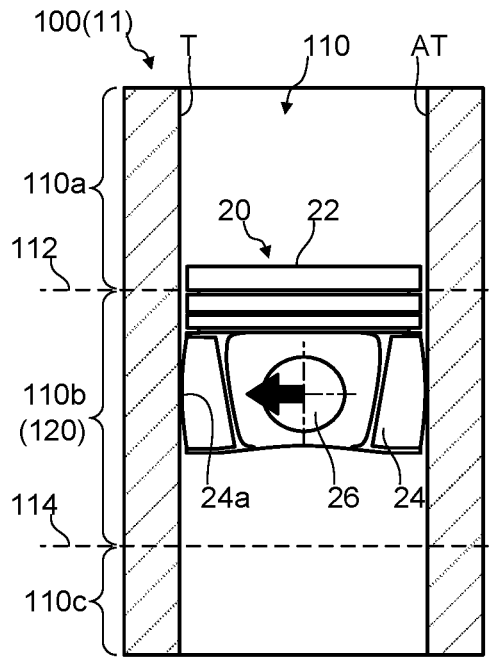
Figure 4D:
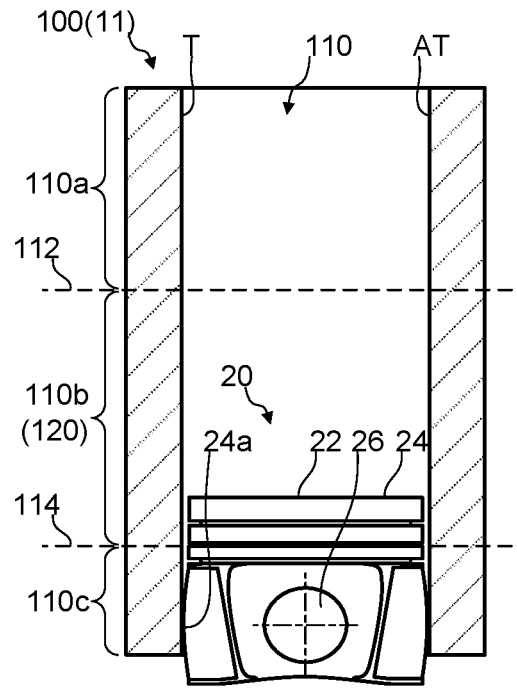

FIG. 2 is a schematic longitudinal cross-sectional view taken along an A-A line of FIG. 1, and FIG. 3 is a schematic longitudinal cross-sectional view taken along a B-B line of FIG. 1. In FIGS. 2 and 3, a configuration of an inner circumference portion of cylinder 100 in cylinder block 11 of engine body 10 illustrated in FIG. 1 is illustrated while illustration of a cylinder heads is omitted. Further, FIGS. 4A to 4D are each a cross-sectional view on a piston operation that generates a lateral pressure (side pressure) in the cylinder. FIG. 4A illustrates a state in which a piston is in a top dead center, FIG. 4B illustrates a state in which the lateral pressure is maximal. Further, FIG. 4C illustrates the piston moving through a central portion and a state in which a large abrasion thereby occurs, and FIG. 4D illustrates a state in which the piston is in a bottom dead center. Note that the lateral pressure is a piston side pressure, which is also referred to as a side thrust. In addition, a thrust side is referred to as thrust (T), and an anti-thrust side is referred to as anti-thrust (AT).

Engine body 10 includes, in addition to cylinder block 11 on which the cylinder head (not illustrated) is mounted at an upper portion, a crank chamber (not illustrated) for storing therein a crank shaft (not illustrated) coupled to piston 20, and intake and exhaust systems connected to the cylinder head and the like.

Cylinder block 11 includes cylinder 100 that stores therein piston 20 in a manner capable of reciprocating (see FIGS. 4A to 4D).

Incidentally, piston 20 is connected to a crank shaft (not illustrated) via a connecting rod (con-rod, not illustrated). Piston 20 is turnably attached to the con-rod with piston pin 26 (see FIG. 4) and includes, as is well known, crown portion 22 that defines a combustion chamber, together with an upper portion of cylinder 100, and skirt portion 24 that is connected to a lower side of crown portion 22.

Crown portion 22 includes recessed portion 21 on a top surface thereof and includes an outer circumferential surface formed in a perfect circle in cross section. An outer circumferential surface of skirt portion 24 is formed in an oval shape in which a diameter in the thrust (T)-anti thrust (AT) direction is longer than a diameter in an extending direction of piston pin 26 (axis direction of piston pin 26 and axis direction of con-rod). The outer circumferential surface of skirt portion 24 may be formed in a perfect circular shape.

Cylinder 100 is a hollowed cylindrical-body formed in cylinder block 11, inside of which piston 20 slides along an axis of the cylinder. In cylinder 100, an inner circumferential surface of upper portion 110a is made a perfect circular shape (substantially perfect circular shape close to perfect circle), and this part is referred to as a perfect-circular inner circumference portion. Further, in cylinder 100, an inner circumferential surface of central portion 110b is made an oval inner circumferential surface in which a diameter in the thrust (T)-anti thrust (AT) direction is minor diameter L, and central portion 110b is regarded as oval inner circumference portion 120. Cylinder 100 includes the perfect-circular inner circumference portion on a side of the top dead center of piston 20 relative to oval inner circumference portion 120.

Upper portion 110a is contiguous to the cylinder head that closes an upper side, and a top surface of a piston head of piston 20 forms a lower surface of the combustion chamber.

Central portion 110b, i.e., oval inner circumference portion 120 is configured to have a less contact area with piston 20, specifically, skirt portion 24 and to reduce sliding abrasion, as compared to a case where the inner circumferential surface of central portion 110b is perfectly circular. In the present embodiment, oval inner circumference portion 120 is formed below a lower edge of skirt portion 24 when piston 20 is in the uppermost position (position at which piston head is positioned to top dead center; position illustrated in FIG. 4A), for example.

Further, preferably, oval inner circumference portion 120 is formed below position (position receiving maximal lateral pressure) 112 in the inner circumferential surface of the cylinder to which the maximal lateral pressure (maximal side thrust) is applied in cylinder 100.

Central portion 110b (oval inner circumference portion 120) is formed below a position at which a combustion pressure acts in combustion and expansion strokes to tilt the con-rod, thereby generating a component force (side thrust force) of the piston pushing the cylinder, and a position with which thrust-side edge portion 24a of skirt portion 24 is in contact.

Oval inner circumference portion 120 is formed such that, in inner circumferential surface 110 of cylinder 100, a diameter extending in the axis direction of piston pin 26 (diameter extending in direction perpendicular to thrust-anti thrust direction) becomes outwardly longer downward from the lower edge of upper portion 110a. The diameter extending in the axis direction of piston pin 26 is a diameter extending in a rear R-front F direction.

A length of central portion 110b in the axis direction (piston-moving direction) is a region where sliding abrasion with piston 20 (skirt portion 24) is larger than that in the upper portion.

Further, at least in cylinder 100, a shape of central portion 110b only needs to be configured with an oval inner circumferential surface shape in which a diameter in the thrust (T)-anti thrust (AT) direction is minor diameter L. For example, only in central portion 110b, the diameter in the thrust (T)-anti thrust (AT) direction may form minor diameter L.

Boundary 114 between central portion 110b and lower portion 110c is a position at which piston 20 is in the bottom dead center (position where lower edge portion of piston 20, in particular, piston head is) (see FIG. 4D), and is a lower edge position of a movable range of piston 20.

Figure 5:
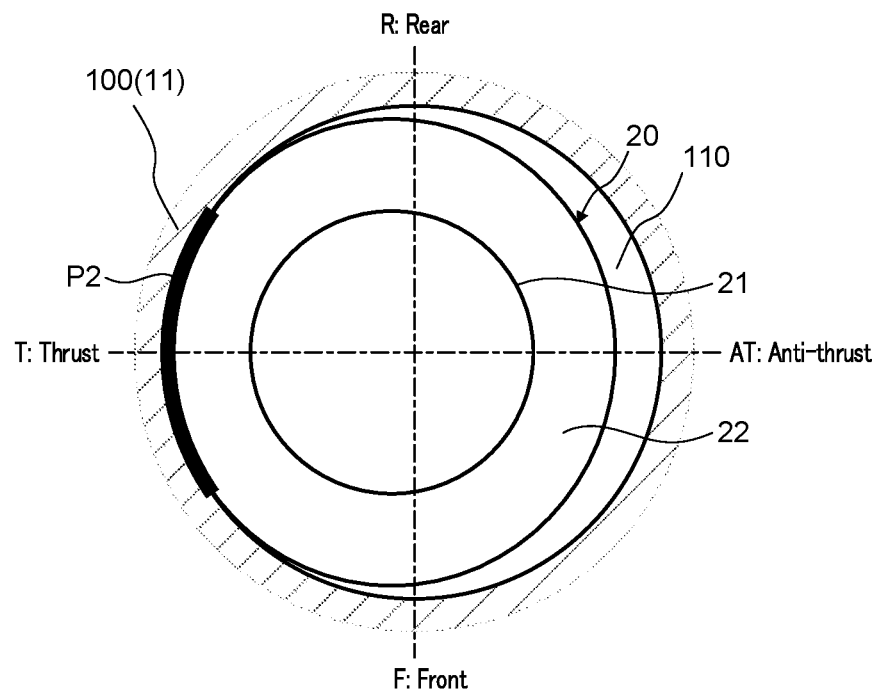
FIG. 5 is a plane cross-sectional view on a relation with a piston at C-C line parts of FIG. 2 and FIG. 3.
Figure 6:
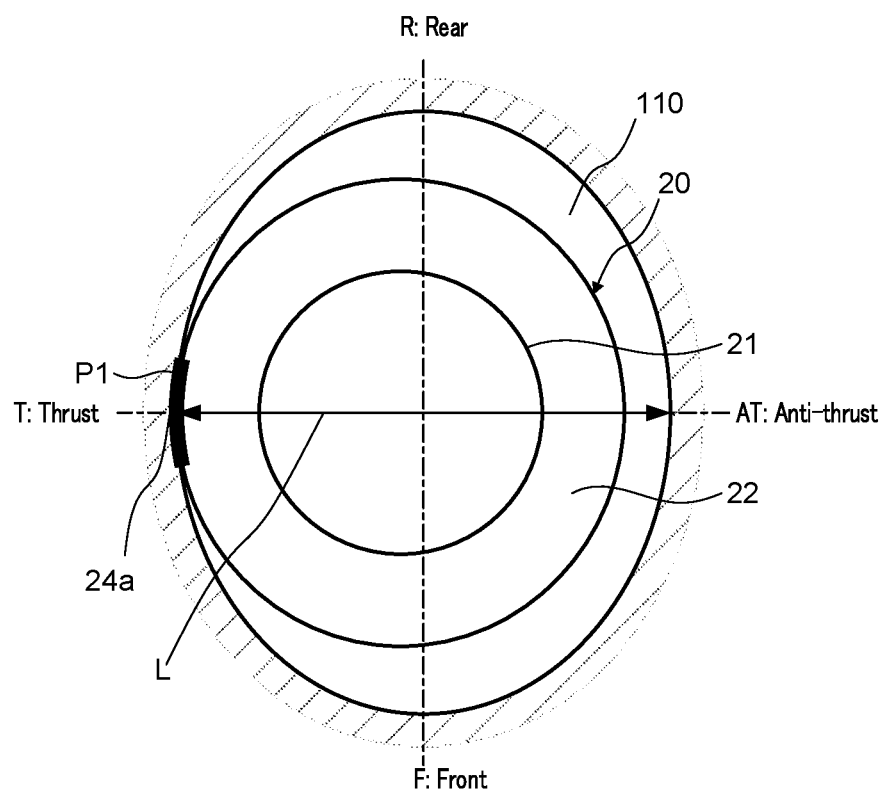
FIG. 6 is a plane cross-sectional view on a relation with a piston at D-D line parts of FIG. 2 and FIG. 3.

FIG. 5 illustrates a position relation between a perfect circular portion of the cylinder indicated in a cross-sectional view taken along a C-C line and a piston in a side thrust position, and FIG. 6 illustrates a position relation between a central portion of the cylinder indicated in a cross-sectional view taken along a D-D line and the piston in the side thrust position.

Gaps between the cylinder inner circumference portions and pistons 20 illustrated in FIGS. 5 and 6 are exaggerated from the actual gaps for easy viewing.

FIGS. 5 and 6 both illustrate a state where piston 20 reciprocatingly sliding in cylinder 100 generates the maximal side thrust.

As illustrated in FIGS. 5 and 6, in engine 1 (see FIG. 1), since upper portion 110a of cylinder 100 is a perfect circular as with piston 20 (piston head), sliding occurs in contact with contacting part P2, thereby securing a gas sealing property and preventing seizure.

In addition, since central portion 110b of cylinder 100 is oval inner circumference portion 120 (central portion 110b) in which the diameter in the thrust-anti thrust direction is minor diameter L, contacting part P1 with piston 20 becomes smaller than that of a case where the inner circumferential surface of central portion 110b is made perfect circular.

Figure 7:
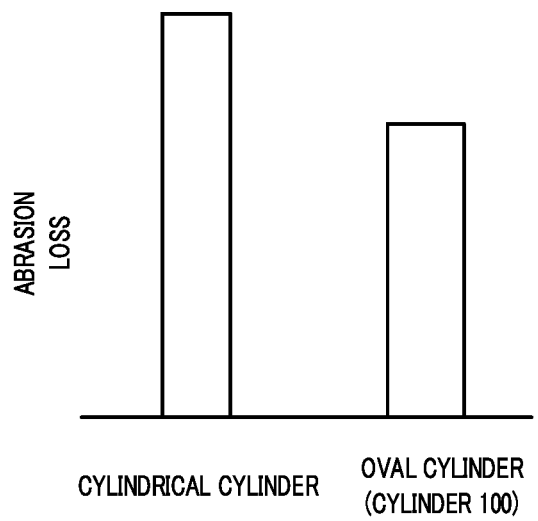
FIG. 7 is a diagram provided for comparison of abrasion loss between a configuration of the internal combustion engine of the present embodiment and a configuration in which a cylinder central portion is formed in a cylindrical shape.

FIG. 7 is a graph comparing, in engine 1, abrasion loss between a configuration of a cylinder central portion relative to a piston with an inner circumferential surface being perfect circular and a configuration of a cylinder central portion according to the present embodiment. As is apparent from FIG. 7, in the present embodiment, a sliding region of the piston skirt can be reduced from central portion 110b of cylinder 100 (liner) to lower portion 110c while retaining an oil film on an upper portion of the cylinder, thereby achieving abrasion reduction.

In addition, unlike a conventional method, there is no need to excessively increase an oval amount of the skirt portion so as to reduce a region of contact between the cylinder and the piston for the purpose of reducing abrasion of the piston skirt portion. That is, a surface pressure of the skirt portion is not increased at the upper portion of the cylinder, and no abrasion deterioration or seizure occurs by the oil film breakage.

The embodiment of the present invention has been described, thus far. It should be noted that the above description is illustrative of a preferred embodiment of the present invention, and the scope of the present invention is not limited thereto. That is, the configuration of the internal combustion engine and the shape of each portion are merely examples, and it is obvious that various modifications and additions to these examples are possible within the scope of the present invention.

INDUSTRIAL APPLICABILITY

An internal combustion engine and a cylinder block according to the present invention are each useful for realizing an internal combustion engine that has an effect of reducing abrasion with a piston while retaining an oil film on an upper portion of a cylinder, and that reduces abrasion sliding with the piston.

The invention claimed is:
1. An internal combustion engine, comprising:
 a cylinder block that includes a cylinder; and
 a piston that is stored in the cylinder in a manner capable of reciprocating along an axis line of the cylinder,
wherein
 the piston contacts an inner surface of the cylinder only through an oil film,
 the inner surface of the cylinder is oval with a minor diameter in a thrust-anti thrust direction, and
 the cylinder includes a perfect-circular inner surface at the point where the piston reaches a top dead center.
2. The internal combustion engine according to claim 1, wherein the oval inner circumference portion is positioned below a position at which a maximal side thrust is received in the cylinder during combustion and expansion strokes.
3. The internal combustion engine according to claim 1, wherein the oval inner circumference portion is positioned below a lower edge position of a skirt portion of the piston that is in a top dead center.
4. A cylinder block, comprising a cylinder that stores therein a piston such that the piston is capable of reciprocating therein,
 wherein an inner surface of the cylinder, which the piston contacts only through an oil film, is oval with a minor diameter in a thrust-anti thrust direction, and
 the cylinder includes a perfect-circular inner surface at the point where the piston reaches a top dead center.

* * * * *